United States Patent
Jasinkiewicz et al.

(10) Patent No.: US 8,523,988 B2
(45) Date of Patent: Sep. 3, 2013

(54) SYSTEM AND METHOD FOR ESTIMATING A MASS OF PARTICULATE MATTER ACCUMULATED IN A PARTICULATE FILTER

(75) Inventors: Paul Jasinkiewicz, Northville, MI (US); Raffaello Ardanese, Troy, MI (US); Michelangelo Ardanese, Ann Arbor, MI (US); Christopher Whitt, Howell, MI (US); Douglas Christopher Sarsen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 353 days.

(21) Appl. No.: 13/004,180

(22) Filed: Jan. 11, 2011

(65) Prior Publication Data

US 2012/0174652 A1    Jul. 12, 2012

(51) Int. Cl.
*B01D 46/42* (2006.01)

(52) U.S. Cl.
USPC .............................. 96/422; 96/417

(58) Field of Classification Search
USPC ..................... 96/417–423; 702/23
See application file for complete search history.

(56) References Cited

U.S. PATENT DOCUMENTS

| | | | | |
|---|---|---|---|---|
| 7,357,822 B2 * | 4/2008 | Hamahata et al. | | 55/283 |
| 7,537,648 B1 * | 5/2009 | Karwacki et al. | | 96/416 |
| 7,758,676 B2 * | 7/2010 | Mital et al. | | 96/113 |
| 2004/0139852 A1 * | 7/2004 | Koga et al. | | 95/20 |
| 2012/0291629 A1 * | 11/2012 | Tylutki et al. | | 95/23 |

FOREIGN PATENT DOCUMENTS

| | | |
|---|---|---|
| DE | 10234340 A1 | 10/2003 |
| DE | 10326780 A1 | 2/2004 |
| DE | 102006000429 A1 | 3/2007 |
| DE | 102007009841 A1 | 9/2008 |

* cited by examiner

*Primary Examiner* — David A Rogers
(74) *Attorney, Agent, or Firm* — Quinn Law Group, PLLC (57) ABSTRACT

A particulate estimation system is configured for estimating a mass of particulate matter accumulated in a particulate filter of an exhaust system. The system includes a memory device, an interface, and a controller. The memory device stores a plurality of modules. Each of the plurality of modules is configured to uniquely estimate an amount of the particulate matter accumulated within the particulate filter over a period of time. The interface receives a plurality of input signals. The plurality of input signals correspond to a plurality of modules that are stored in the memory device. The controller derives a hybrid model based on the input signals. The hybrid model is configured to provide an output that is an estimation of the amount of particulate matter accumulated within the particulate filter over the period of time as a function of the plurality of input signals.

20 Claims, 4 Drawing Sheets

SYSTEM AND METHOD FOR ESTIMATING A MASS OF PARTICULATE MATTER ACCUMULATED IN A PARTICULATE FILTER

TECHNICAL FIELD

The method generally relates to a system and method of estimating a mass of particulate matter accumulated in a particulate filter of an exhaust system.

BACKGROUND

An exhaust system for a vehicle may include a particulate filter. If the engine includes a diesel engine, then the particulate filter is referred to as a diesel particulate filter. The particulate filter traps particulate matter, i.e., soot, from the exhaust gas of the engine. The particulate filter may include one or more substrates that define a plurality of apertures, through which the exhaust gas must flow. The particulate matter collects on the substrate as the exhaust gas flows through the apertures. The particulate filter is occasionally regenerated to remove the collected particulate matter. Regeneration of the particulate filter includes heating the particulate filter to a temperature sufficient to burn the collected particulate matter, which converts the particulate matter to carbon dioxide that dissipates into the atmosphere.

A soot module may be employed to estimate and predict soot accumulation within the particulate filter to assist in determining when the particulate filter is required to be regenerated. When the soot module estimates that the soot accumulation has reached a predefined threshold, that particulate filter may regenerate.

SUMMARY

A particulate estimation system configured for estimating a mass of particulate matter accumulated in a particulate filter of an exhaust system is provided. The particulate estimation system includes a memory device, an interface, and a controller. The memory device is configured for storing a plurality of modules. Each of the plurality of modules is configured to uniquely estimate an amount of the particulate matter accumulated within the particulate filter over a period of time. The interface is configured to receive a plurality of selections from a user. The plurality of selections correspond to a plurality of modules that are stored in the memory device. The controller is configured to derive a hybrid model based on the plurality of selections received from the user. The hybrid model is configured to provide an output that is an estimation of the amount of particulate matter accumulated within the particulate filter over the period of time as a function of the plurality of selections of the user.

A method is also provided for selectively configuring a particulate estimation system to estimate a mass of particulate matter accumulated in a particulate filter of an exhaust system. The method includes storing a plurality of modules in a memory device. Each of the plurality of modules is configured to uniquely estimate an amount of the particulate matter accumulated within the particulate filter over a period of time. The method further includes selecting a plurality of modules stored in the memory device and deriving a hybrid model based on the plurality of modules selected. The hybrid model is configured to provide an output that is an estimation of the amount of particulate matter accumulated within the particulate filter over the period of time as a function of the plurality of modules selected.

A method of selectively configuring a particulate estimation system to estimate a mass of particulate matter accumulated in a particulate filter of an exhaust system is also provided. The method includes storing a plurality of modules in a memory device in terms of soot estimation, i.e., mass and rate-based, and rankings of each module based on model inputs. Each of the plurality of modules is configured to uniquely estimate an amount of the particulate matter accumulated within the particulate filter over a period of time. The modules may be a stand-alone soot model or a model that performs corrections and/or compensation to other soot models. The method further includes presenting the plurality of modules stored in the memory device on a display in the ranked order and offering the possibility of selecting a plurality of modules presented on the display. A plurality of hybrid models are derived based on the plurality of modules selected. The plurality of hybrid models are configured to provide outputs that are a more accurate estimation of the amount of particulate matter accumulated within the particulate filter over the period of time as a function of the plurality of modules selected. Each of the plurality of hybrid models are ranked in a ranked order as a function of at least one vehicle operating condition.

The above features and advantages and other features and advantages of the present invention are readily apparent from the following detailed description of the best modes for carrying out the invention when taken in connection with the accompanying drawings.

DETAILED DESCRIPTION

Figure 1:
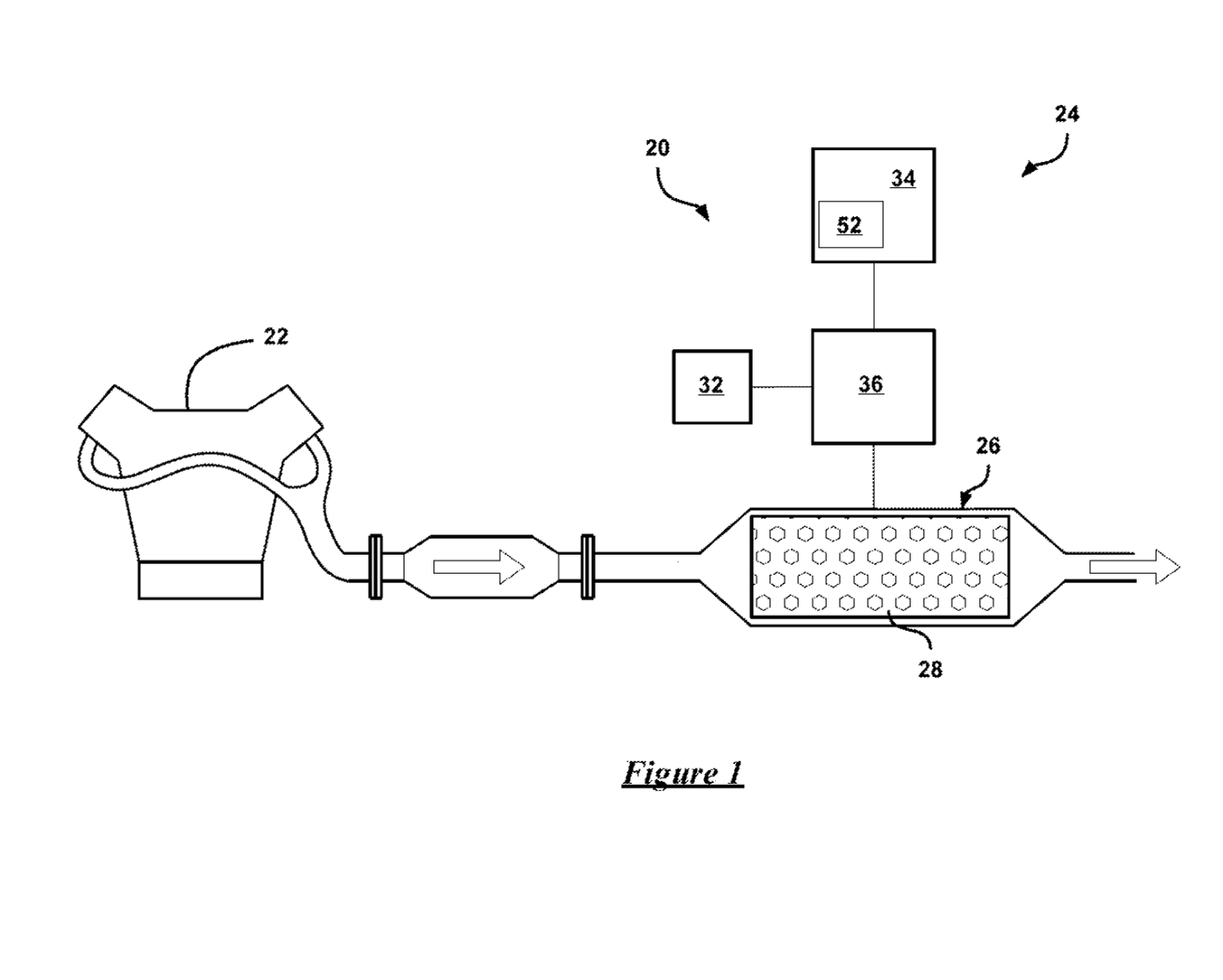
FIG. 1 is a schematic diagram of an engine and an exhaust system of a vehicle having a particulate filter and a particulate estimation system configured for measuring loading and unloading of particulate matter in the particulate filter.

Referring to FIG. 1, wherein like numerals indicate like parts throughout the several views, an exhaust system 20 of a vehicle is shown generally at 20. The exhaust system 20 directs and treats exhaust gas from an engine 22.

The exhaust system 20 includes a particulate estimation system 24 and a particulate filter 26. The particulate estimation system 24 is operatively connected to the particulate filter 26. The particulate filter 26 filters particulate matter, i.e., soot, from the exhaust gas of the engine 22. The engine 22 may be a diesel engine, a gasoline engine, or any other engine which produces particulate matter during a combustion process. The particulate filter 26 may include one or more substrates 28 that define a plurality of apertures, through which the exhaust gas must flow. The particulate matter collects on the substrate 28 as the exhaust gas flows through the apertures. The particulate filter 26 is occasionally selectively regenerated to remove the collected particulate matter. Regeneration of the particulate filter 26 includes heating the particulate filter 26 to a temperature sufficient to burn the collected particulate matter, which converts the particulate matter to carbon dioxide that dissipates into the atmosphere.

The particulate estimation system 24 is configured for estimating a mass of particulate matter accumulated in the particulate filter 26 of the exhaust system 20. The particulate estimation system 24 includes a memory device 32, an interface 34, and a controller 36. The memory device 32 is configured for storing a plurality of modules 38 (shown in FIG. 2). The interface 34 is operatively connected to the controller 36 and is configured to receive input signals based on a plurality of selections from a user, such as a calibrator or programmer of the vehicle. Each of the selections corresponds to one of the modules 38 stored in the memory device 32. The interface 34 may be a personal computer (PC) or any other interface 34 device configured for interacting with and programming the controller 36.

In general, computing systems and/or devices, such as the controller 36, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Referring again to FIG. 2, each of the plurality of modules 38 may be an algorithm, a subroutine, or other automated functionality that is configured to uniquely estimate an amount of the particulate matter accumulated within the particulate filter 26 over a period of time to assist in the determination of when to regenerate the particulate filter 26. These modules 38 may be of the type generally known in the art. Examples of modules 38 include, but are not limited to, a pressure change module 40 (DP module), which estimates soot based on either differential pressure sensor across DPF or absolute pressure sensor upstream or downstream of DPF, a Lambda module 42 (λ module), which bases the soot estimation on Lambda sensor signal, a statistical module 44 (ST module), which predicts soot based on estimated soot rates for various driving profiles, a kinematics module 46 (k module), which estimates soot burned based on chemical reactions, a continuous regenerating trap module 48 (CRT™ module), which corrects the DP module 40 for accuracy loss due to passive regeneration, and the like. Each of the modules 38 measure the theoretical accumulation of soot in the particulate filter 26 based on input signals associated with that specific module. The input signals are a function of the vehicle operating conditions. Examples of the vehicle operating conditions may include, but are not limited to, altitude, vehicle engine speed, engine load, temperature, and the like. Signal-based ranking may be performed on each of the modules 38 to rank the soot estimation accuracy, i.e., the accuracy at which the model can predict the actual particulate matter accumulating in the particulate filter 26, at the different vehicle operating conditions. The modules 38 are designed so that they can be tightly connected to their specific input signal. For example while one module may be more accurate at altitudes above 5,000 feet, another module may be more accurate at engine speeds exceeding 3,000 revolutions per minute (RPM). Therefore, as the engine 22 operates, different modules 38 may be more accurate at different times.

Figure 2:
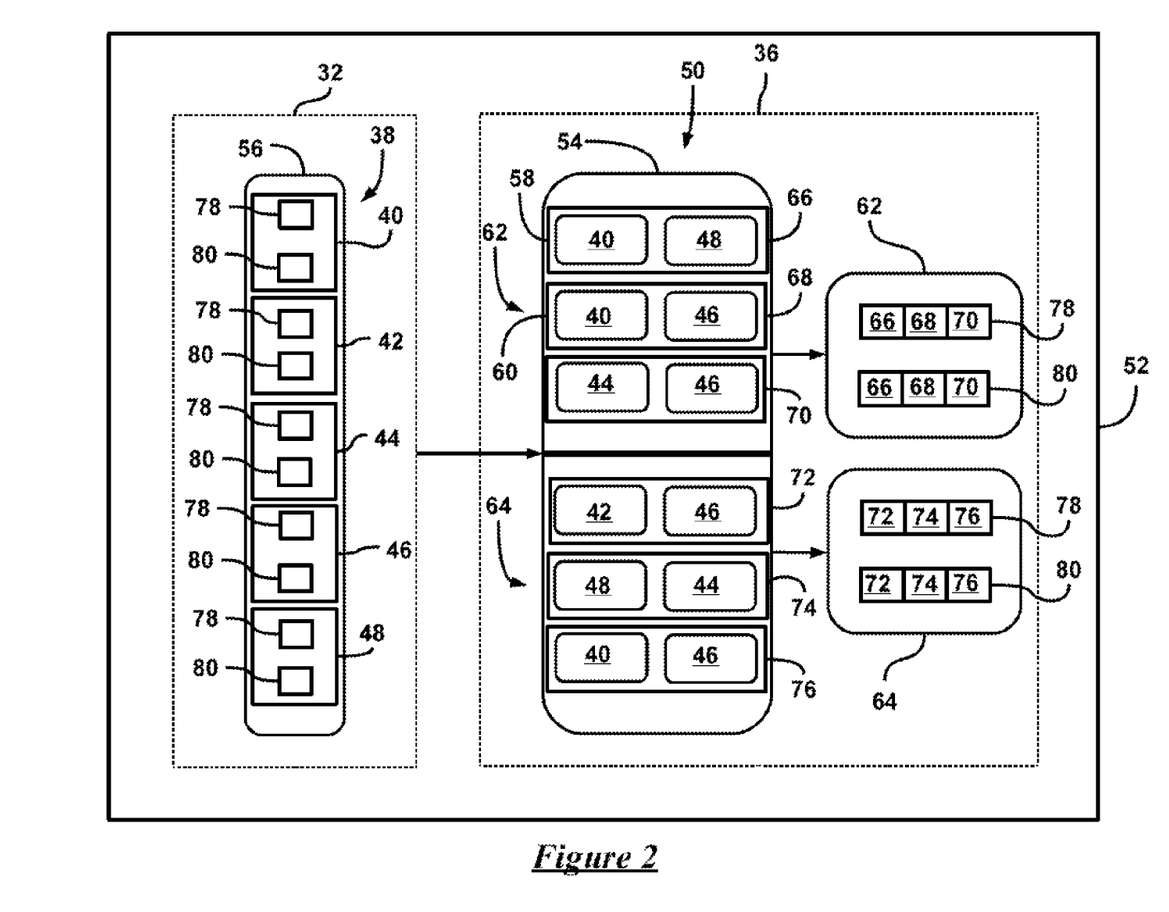
FIG. 2 is a schematic diagram illustrating a library, including a plurality of modules, and a configuration block formed from various combinations of the modules to form a plurality of hybrid models that estimate loading and unloading of the particulate filter.

The controller 36, which is operatively connected to the memory device 32 and the interface 34, is configured to derive at least one hybrid model 50, as shown in FIG. 2, based on the number of selections received from the user. More specifically, the controller 36 may be configured to derive a plurality of different hybrid models 50. This means that each hybrid model 50 is a combination of the plurality of modules 38 selected by the user through the interface 34. Additionally, each hybrid model 50 may be comprised of a unique combination of modules 38. Each hybrid model 50 is independently selected based on the plurality of selections received from the user in the interface 34. Each hybrid model 50 is, in turn, configured to provide an output that is an estimation of the amount of particulate matter accumulated within the particulate filter 26 over the period of time, as a function of the plurality of selections from the user. More specifically, the estimation of particulate matter accumulated within the particulate filter 26 over the period of time may be a sum total of the amount of the particulate matter accumulated within the particulate filter 26 over a period of time for each module 38 selected by the user through the interface 34. For example, referring to FIGS. 2 and 3, if the user selects two different modules 38 to create one hybrid model 50, each individual module 38 provides a unique estimation of the amount of particulate matter accumulated within the particulate filter 26 over the period of time. Therefore, the sum total output of the hybrid model 50, over the same period of time, would be the same unique estimations of each of the selected modules 38, added together.

Referring to FIG. 2, the interface 34 may present a display 52 that displays a configuration block 54 and a library 56 to the user. The configuration block 54 is configured such that the user may selectively combine the desired modules 38 displayed in the library 56 to create one or more unique hybrid models 50. The hybrid models 50, created by the user, are displayed in the configuration block 54. The library 56 presents the modules 38 available to the user from the memory device 32 when creating the hybrid modules 38. The creation of the hybrid models 50 may be based, in part, on a calibration strategy, design of experiments (DOE), accuracy target expertise, calibration time limitations, hardware limitations, and the like. For each hybrid model, the user decides on one or more modules 38 that will be combined. By way of example, referring to FIGS. 2 and 3, a first hybrid model 58 may be created by combining the DP module 40 and the CRT module 48 to provide an output that is the sum total output of the combination of the outputs of CRT and DP modules 48, 40. Similarly, a second hybrid model 60 may be created by combining the λ module 42 and the k module 46 to provide an output that is the sum total output of the combination of the outputs of the λ and k modules 42, 46. Any number of hybrid models 50 may be created, as desired by the user. Additionally, each hybrid model 50 may include any number of modules 38, such as one, three, or more, as desired by the user. This provides flexibility to the user when programming or calibrating the particulate estimate system.

Referring again to FIG. 2, the hybrid models 50 may include a plurality of hybrid loading models 62 and a plurality of hybrid unloading models 64, derived by the controller 36. More specifically, each of the plurality of hybrid loading models 62 is configured to provide an output that is an estimation of the amount of particulate matter accumulated within the particulate filter 26 over the period of time, as a function of the plurality of selections from the user, as the exhaust system 20 is in a loading condition, i.e., "loading". The loading condition is the period of time, in between two active regenerations, in which the particulate matter is accumulating in the particulate filter 26. Likewise, each of the plurality of hybrid unloading models 64 is configured to provide an output that is an estimation of the amount of particulate matter accumulated within the particulate filter 26 over the period of time as a function of the plurality of selections from the user as the exhaust system 20 is in an unloading condition, i.e., "unloading". The unloading condition is the period of time in which, due to active regeneration, the particulate matter is being burned off at high exhaust temperature from the particulate filter 26, while the particulate matter is still flowing into the particulate filter 26 and being accumulated.

Referring again to FIG. 2, the plurality of hybrid loading and unloading models 62, 64 may be selectively created in the configuration block 54 by the user in order to measure the soot accumulation during the respective loading condition and/or the unloading condition of the particulate filter 26. More specifically, to estimate the loading of the particulate matter in the particulate filter 26, the user may create any desired number of unique hybrid models 50 to estimate the loading and/or unloading of the particulate matter in the particulate filter 26. In one embodiment, shown in FIG. 2, the plurality of hybrid loading models 62 may be different than the plurality of hybrid unloading models 64. For example, for the loading condition, a first hybrid loading model 66 may be a combination of the DP module 40 and the CRT module 48; a second hybrid loading model 68 may be a combination of the λ module 42 and the k module 46; and a third hybrid loading model 70 may be a combination of the ST module 44 and the k module 46. To estimate the unloading of the particulate matter from the particulate filter 26 during the unloading condition, the user may create a first hybrid unloading model 72 that is a combination of the λ module 42 and the k module 46; a second hybrid unloading model 74 that is a combination of the CRT module 48 and the ST module 44; and a third hybrid unloading model 76 that is a combination of the DP module 40 and the k module 46. In this example, each of the hybrid loading models 66, 68, 70 is different than each of the hybrid unloading models 72, 74, 76. It should be appreciated, however, that the user can configure the hybrid loading models 66, 68, 70 and hybrid unloading models 72, 74, 76 to be of any desired combination of modules 38. For example, the user may choose five unique hybrid loading models 62 and only three unique hybrid unloading models 64. By way of another example, the user may create one or more of the hybrid loading models 62 to be the same as one or more of the hybrid unloading models 64, while any of the other models 62, 64 are different from one another. In another embodiment, the plurality of hybrid loading models 62 is the same as the plurality of hybrid unloading modes 64.

Figure 3:
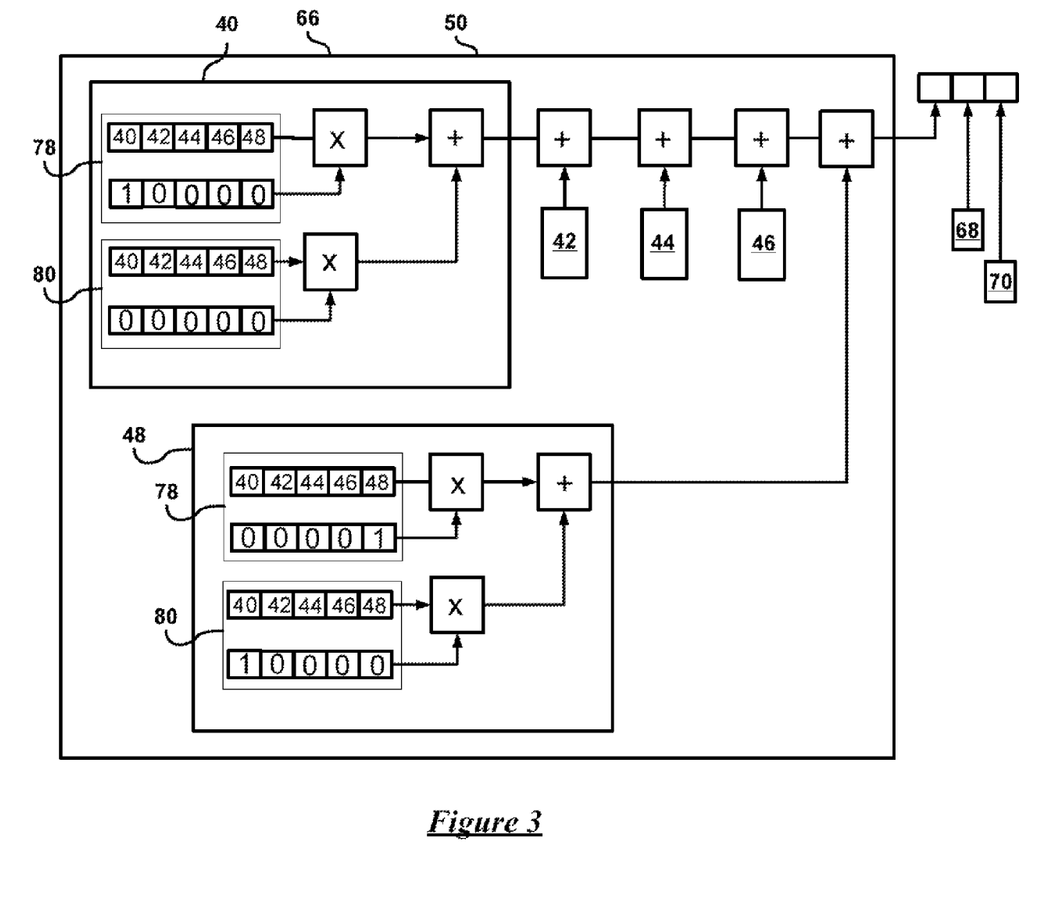
FIG. 3 is a schematic diagram illustrating a plurality of hybrid models being implemented in the configuration block.

Referring to FIGS. 2 and 3, each of the plurality of modules 38 is stored in a table as at least one of a soot rate array 80 and a soot mass array 78. Each of the plurality of soot rate arrays 80 is configured to provide an output that is an estimation of a rate the particulate matter is accumulating within the particulate filter 26, e.g., grams per second (g/s), and the like, for each of the plurality of modules 38. Likewise, each of the plurality of soot mass arrays 78 are configured to provide an output that is an estimation of a total mass of the particulate matter accumulated within the particulate filter 26 over a period of time, e.g., grams (g), for each of the plurality of modules 38.

The soot mass array 78 may be derived over a time interval to be able to provide a soot rate, and the module that returns the soot rate may be integrated to obtain the soot mass. Each array 78, 80 is binary such that the modules 38 associated with each array 78, 80 are associated with a binary symbol 1 or 0, as illustrated in FIG. 3. The binary symbol 1 is associated with an "on" or active position and the binary symbol 0 is associated with an "off" or inactive position.

Accordingly, the plurality of selections from the user on the interface 34 used to create the hybrid model 50 may be at least one of a plurality of the soot rate arrays 80 and a plurality of the soot mass arrays 78. The hybrid model 50 is therefore configured to provide an output that is an estimation of the amount of particulate matter accumulated within the particulate filter 26 over the period of time, as a function of the selected soot rate arrays 80 or the soot mass arrays 78. The soot rate array 80 and the soot mass array 78 are each configured to be individually activated or selected by the user when the user selects a module 38 from the interface 34. More specifically, to activate a desired module, the user decides on whether the soot rate array 80 or the soot mass array 78 should be selected. In order to make this selection, the soot rate array 80 and the soot mass array 78 for each module 38 are configured such that only one of the soot rate array 80 and the soot mass array 78 may be in the on position, i.e., the binary symbol "1" is selected, while the other array within that module 38 is in the off position, i.e., the binary symbol "0" is selected. For example, referring again to FIG. 3, to activate the soot mass array 78 of the DP module 40, the user operatively selects the binary symbol of 1. Therefore, when the DP module 40 is activated, the soot mass in the particulate filter 26 is calculated over time using the DP module 40. Likewise, to activate the soot mass array 78 of the CRT module 48, the user operatively selects the binary symbol of 1.

Each of the hybrid models 50 may be ranked, i.e., by the user, based on an accuracy of the estimation of the amount of the particulate matter accumulated over a period of time as a function of an input signal quality at different vehicle operating conditions. The ranking may help to determine which hybrid model 50 is used to estimate the particulate matter accumulated within the particulate filter 26 over any desired time period. For example, at a particular combination of vehicle operating conditions, one of the hybrid models 50 will have a higher ranking than all of the other hybrid models 50. This hybrid model 50 with the highest ranking provides the most accurate estimate of particulate matter accumulation at that combination of vehicle operating conditions. It should be appreciated that the ranking of the hybrid models 50 is not limited to being performed by the user, but may be performed in any other way, as known to those skilled in the art.

Figure 4:
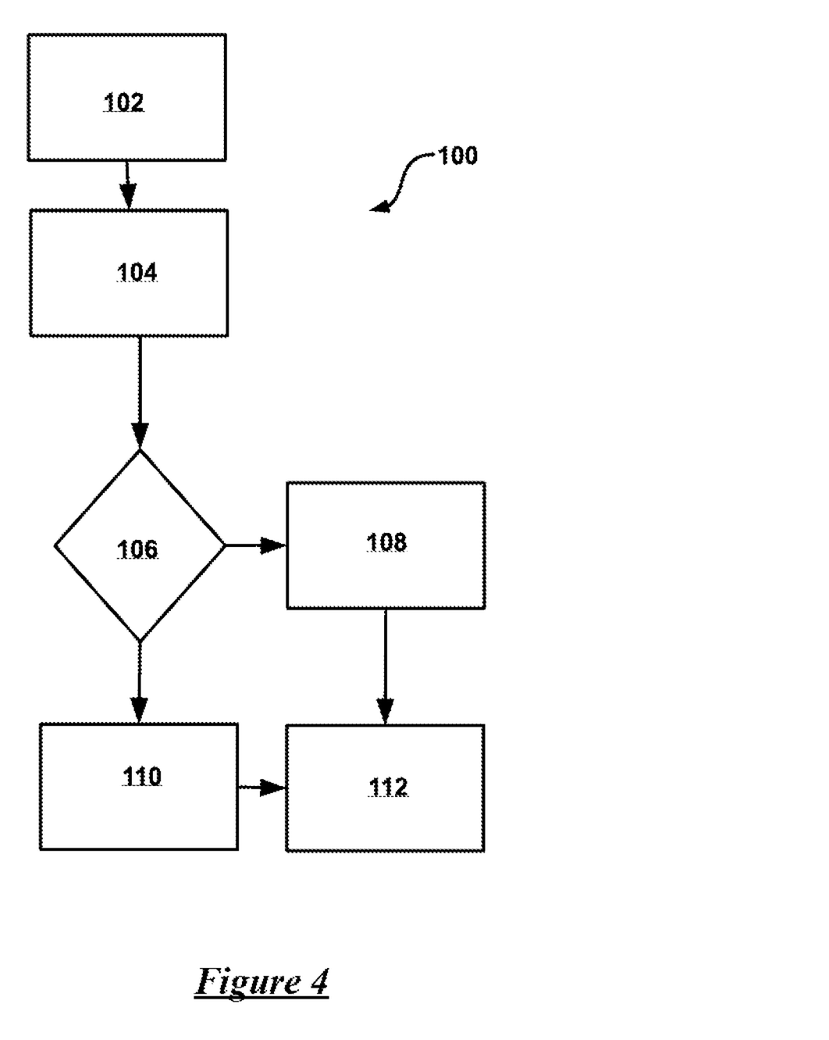
FIG. 4 is a flow chart showing a method of configuring the particulate estimation system to estimate the mass of particulate matter accumulated in the particulate filter.

Referring to FIG. 4, a method of configuring the particulate estimation system 24 to estimate a mass of particulate matter accumulated in the particulate filter 26 of the exhaust system 20 is provided at 100. The method includes storing a plurality of modules 38 in the memory device 32 at 102. As described above, each of the plurality of modules 38 is configured to uniquely estimate an amount of the particulate matter accumulated within the particulate filter 26 over a period of time. Storing the plurality of modules 38 in the memory device 32 at 102 may include storing a plurality of the soot rate arrays 80 and a plurality of soot mass arrays 78. Each of the plurality of soot rate arrays 80 is configured to provide an output that is an estimation of a rate the particulate matter is accumulating within the particulate filter 26. Likewise, each of the plurality of soot mass arrays 78 is configured to provide an output that is an estimation of a total mass of the particulate matter accumulated within the particulate filter 26 over a period of time.

Optionally, the method includes ranking each of the plurality of modules 38 at 104, and the corresponding plurality of soot rate arrays 80 and soot mass arrays 78, based on an accuracy of the estimation of the amount of the particulate matter accumulated over a period of time, as a function of an input signal quality at different vehicle operating conditions.

The method also includes selecting a plurality of modules 38 stored in the memory device 32 at 106. Selecting the plurality of modules 38 at 106 may mean that the user selects at least one of the plurality of soot rate arrays 80 at 108 and the plurality of soot mass arrays 78 at 110 from the memory device 32.

The method also provides deriving a hybrid model 50, as a function of the soot rate arrays 80 or the soot mass arrays 78 selected by the user at 106. The hybrid model that has been derived is configured to provide an output that is an estimation of the amount of particulate matter accumulated within the particulate filter 26 over the period of time as a function of the plurality of modules 38 selected and as a function of either the plurality of soot rate arrays 80 or the plurality of soot mass arrays 78. The plurality of selections from the user may be a sum total of the amount of the particulate matter accumulated within the particulate filter 26 over a period of time for each module, corresponding to each of the plurality of selections from the user.

By repeating the method 100, a plurality of hybrid models 50 may be derived. Each of the plurality of hybrid models 50 is selectively based on the plurality of selections received from the user at the interface 34. Each of the plurality of hybrid models 50 may be configured to provide an output that is an estimation of the amount of particulate matter accumulated within the particulate filter 26 over the period of time as a function of the plurality of selections from the user at 106. Each of the hybrid models 50 may be comprised of a unique combination of modules 38.

The hybrid models 50 may be derived as the plurality of hybrid loading models 62 and/or the plurality of hybrid unloading models 64, as desired by the user, as shown in FIGS. 2 and 3. Each of the plurality of hybrid loading models 62 is configured to provide an output that is an estimation of the amount of particulate matter accumulated within the particulate filter 26 over the period of time as a function of the plurality of selections from the user as the exhaust system 20 is in the loading condition. Likewise, each of the plurality of hybrid unloading models 64 is configured to provide an output that is an estimation of the amount of particulate matter accumulated within the particulate filter 26 over the period of time as a function of the plurality of selections from the user as the exhaust system 20 is in the unloading condition. The plurality of hybrid loading models 62 created by the user may be different than the plurality of hybrid unloading models 64. Alternatively, the plurality of hybrid loading models 62 created by the user may be the same as the plurality of hybrid unloading models 64. While the best modes for carrying out the invention have been described in detail, those familiar with the art to which this invention relates will recognize various alternative designs and embodiments for practicing the invention within the scope of the appended claims.

The invention claimed is:

1. A particulate estimation system configured for estimating a mass of particulate matter accumulated in a particulate filter of an exhaust system, the particulate estimation system comprising:
   a memory device configured for storing a plurality of modules;
   wherein each of the plurality of modules is configured to uniquely estimate an amount of the particulate matter accumulated within the particulate filter over a period of time;
   an interface configured to receive a plurality of input signals;
   wherein the plurality of input signals correspond to a plurality of modules stored in the memory device;
   a controller configured to derive a hybrid model based on the plurality of input signals;
   wherein the hybrid model is configured to provide an output that is an estimation of the amount of particulate matter accumulated within the particulate filter over the period of time as a function of the plurality of input signals.

2. A particulate estimation system, as set forth in claim 1, wherein a function of the plurality of input is further defined as a sum total of the amount of the particulate matter accumulated within the particulate filter over a period of time for each module corresponding to each of the plurality of input signals.

3. A particulate estimation system, as set forth in claim 1, wherein each of the plurality of modules is stored as at least one of a plurality of soot rate arrays and a plurality of soot mass arrays such that each of the plurality of soot rate arrays are configured to provide an output that is an estimation of a rate the particulate matter accumulates within the particulate filter over a given period of time and each of the plurality of soot mass arrays are configured to provide an output that is an estimation of a total mass accumulated within the particulate matter over a period of time.

4. A particulate estimation system, as set forth in claim 3, wherein the plurality of input signals is further defined as being at least one of the soot rate array and the soot mass array for each of the plurality of modules;
   wherein the hybrid model is further defined as being configured to provide an output that is an estimation of the amount of particulate matter accumulated within the particulate filter over the period of time as a function of one of the plurality of soot rate arrays and the soot mass arrays.

5. A particulate estimation system, as set forth in claim 1, wherein the controller is further defined as being configured to derive a plurality of hybrid models;
   wherein each of the plurality of hybrid models is selectively based on the plurality of input signals;
   wherein each of the plurality of hybrid models is configured to provide an output that is an estimation of the amount of particulate matter accumulated within the particulate filter over the period of time, as a function of the plurality of input signals.

6. A particulate estimation system, as set forth in claim 5, wherein each of the hybrid models is ranked based on an accuracy of the estimation of the amount of the particulate matter accumulated over a period of time, as a function of at least one vehicle operating condition.

7. A particulate estimation system, as set forth in claim 5, wherein the controller is further defined as being configured to derive a first plurality of hybrid models and a second plurality of hybrid models;
   wherein each of the first plurality of hybrid models is configured to provide an output that is an estimation of the amount of particulate matter accumulated within the particulate filter over the period of time as a function of the plurality of input signals, as the exhaust system is in a loading condition; and
   wherein each of the second plurality of hybrid models is configured to provide an output that is an estimation of the amount of particulate matter accumulated within the particulate filter over the period of time as a function of the plurality of input signals as the exhaust system is in an unloading condition.

8. A particulate estimation system, as set forth in claim 7, wherein the first plurality of hybrid models is different than the second plurality of hybrid models.

9. A particulate estimation system, as set forth in claim 7, wherein the first plurality of hybrid models is the same as the second plurality of hybrid models.

10. A method of selectively configuring a particulate estimation system to estimate a mass of particulate matter accumulated in a particulate filter of an exhaust system, the method comprising:
   storing a plurality of modules in a memory device;
   wherein each of the plurality of modules is configured to uniquely estimate an amount of the particulate matter accumulated within the particulate filter over a period of time;
   selecting at least two of the plurality of modules stored in the memory device;
   deriving a hybrid model based on the at least two of the plurality of modules selected;
   wherein the hybrid model is configured to provide an output that is an estimation of the amount of particulate matter accumulated within the particulate filter over the period of time as a function of the plurality of modules selected.

11. A method, as set forth in claim 10, wherein a function of the plurality of input signals an estimation of the amount of particulate matter accumulated within the particulate filter is further defined as the sum total of the estimated amount of the particulate matter accumulated within the particulate filter over a period of time for each module corresponding to each of the plurality of models selected.

12. A method, as set forth in claim 10, wherein deriving a hybrid model is further defined as deriving a plurality of hybrid models;
   wherein each of the plurality of hybrid models is selectively based on the plurality of models selected;
   wherein each of the plurality of hybrid models is configured to provide an output that is an estimation of the amount of particulate matter accumulated within the particulate filter over the period of time as a function of the plurality of models selected; and
   wherein each of the hybrid models is comprised of a unique combination of modules.

13. A method, as set forth in claim 10, further comprising ranking each of the plurality of hybrid models based on an accuracy of the estimation of the amount of the particulate matter accumulated over a period of time as a function of at least one vehicle operating condition.

14. A method, as set forth in claim 10, wherein storing a plurality of modules is further defined as storing a plurality of modules as a plurality of soot rate arrays and a plurality of soot mass arrays such that each of the plurality of soot rate arrays are configured to provide an output that is an estimation of a rate the particulate matter is accumulating within the particulate filter over a period of time, corresponding to each of the plurality of modules, and each of the plurality of soot mass arrays are configured to provide an output that is an estimation of a total mass of the particulate matter accumulated within the particulate filter over a period of time, corresponding to each of the plurality of modules.

15. A method, as set forth in claim 14, wherein selecting a plurality of modules is further defined as selecting a plurality of modules, including at least one of the corresponding soot rate array and soot mass array.

16. A method, as set forth in claim 15, wherein the hybrid model is further defined as being configured to provide an output that is an estimation of the amount of particulate matter accumulated within the particulate filter over the period of time as a function of one of the plurality of soot rate arrays and the soot mass arrays.

17. A method, as set forth in claim 10, wherein deriving a hybrid model is further defined as deriving a first plurality of hybrid models and a second plurality of hybrid models;
   wherein each of the first plurality of hybrid models is configured to provide an output that is an estimation of the amount of particulate matter accumulated within the particulate filter over the period of time as a function of the plurality of models selected as the exhaust system is in a loading condition; and
   wherein each of the second plurality of hybrid models is configured to provide an output that is an estimation of the amount of particulate matter accumulated within the particulate filter over the period of time as a function of the plurality of models selected as the exhaust system is in an unloading condition.

18. A method, as set forth in claim 17, wherein the at least one of the first plurality of hybrid models is different than the second plurality of hybrid models.

19. A method, as set forth in claim 17, wherein the first plurality of hybrid models are the same as the second plurality of hybrid models.

20. A method of selectively configuring a particulate estimation system to estimate a mass of particulate matter accumulated in a particulate filter of an exhaust system, the method comprising:
   storing a plurality of modules in a memory device;
   wherein each of the plurality of modules is configured to uniquely estimate an amount of the particulate matter accumulated within the particulate filter over a period of time;
   presenting the plurality of modules stored in the memory device on a display in the ranked order;
   selecting a plurality of modules presented on the display;
   deriving a plurality of hybrid models based on the plurality of modules selected;
   wherein the plurality of hybrid models are configured to provide an output that is an estimation of the amount of particulate matter accumulated within the particulate filter over the period of time as a function of the plurality of modules selected; and ranking each of the plurality of hybrid models in a ranked order as a function of at least one vehicle operating condition.

\* \* \* \* \*